United States Patent
Song et al.

(10) Patent No.: US 11,222,751 B2
(45) Date of Patent: Jan. 11, 2022

(54) MULTI-LAYER CERAMIC ELECTRONIC COMPONENT AND MANUFACTURING METHOD THEREOF

(71) Applicant: SAMSUNG ELECTRO-MECHANICS CO., LTD., Suwon-si (KR)

(72) Inventors: Young Ah Song, Suwon-si (KR); Bong Gyu Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 43 days.

(21) Appl. No.: 16/829,640

(22) Filed: Mar. 25, 2020

(65) Prior Publication Data

US 2021/0183576 A1 Jun. 17, 2021

(30) Foreign Application Priority Data

Dec. 12, 2019 (KR) .......................... 10-2019-0165448

(51) Int. Cl.
| | |
|---|---|
| *H01G 4/232* | (2006.01) |
| *H01G 4/30* | (2006.01) |
| *H01G 4/12* | (2006.01) |
| *H01G 4/248* | (2006.01) |
| *H01G 4/012* | (2006.01) |

(52) U.S. Cl.
CPC ........... *H01G 4/2325* (2013.01); *H01G 4/012* (2013.01); *H01G 4/1227* (2013.01); *H01G 4/248* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 9,202,640 B2 * | 12/2015 | Zenzai ................... | H01G 4/252 |
| 9,818,547 B1 * | 11/2017 | Yoon ...................... | H01G 4/1227 |
| 2001/0017420 A1 * | 8/2001 | Iwao ....................... | H01F 41/046 |
| | | | 257/758 |

(Continued)

FOREIGN PATENT DOCUMENTS

| | | |
|---|---|---|
| JP | 2008-042068 A | 2/2008 |
| JP | 2009-267191 A | 11/2009 |
| KR | 10-1598583 B1 | 3/2016 |

*Primary Examiner* — Dion R. Ferguson
(74) *Attorney, Agent, or Firm* — Morgan, Lewis & Bockius LLP

(57) ABSTRACT

A multilayer ceramic electronic component includes a ceramic body including first and second surfaces opposing each other in a thickness direction, third and fourth surfaces opposing each other in a width direction, and fifth and sixth surfaces opposing each other in a longitudinal direction, and including a capacitance formation portion having a dielectric layer and first and second internal electrodes disposed to be stacked in the thickness direction with the dielectric layer interposed therebetween; first and second conductive layers disposed on the fifth and sixth surfaces of the ceramic body, respectively, and each including a first conductive metal; and first and second external electrodes each including a second conductive metal and covering the first and second conductive layers, respectively. The first and second conductive layers each have a network structure.

20 Claims, 6 Drawing Sheets

(56) References Cited

U.S. PATENT DOCUMENTS

| | | | |
|---|---|---|---|
| 2008/0253060 A1* | 10/2008 | Ito | H01G 4/1227 |
| | | | 361/321.4 |
| 2009/0268372 A1 | 10/2009 | Ogawa et al. | |
| 2012/0268861 A1* | 10/2012 | Lee | H01G 4/12 |
| | | | 361/321.2 |
| 2013/0201601 A1* | 8/2013 | Nishisaka | H01G 4/2325 |
| | | | 361/301.4 |
| 2014/0268485 A1* | 9/2014 | Kang | H01B 1/22 |
| | | | 361/301.4 |
| 2015/0325373 A1* | 11/2015 | Satou | H01G 4/005 |
| | | | 361/301.4 |
| 2019/0304683 A1* | 10/2019 | Terashita | H01G 2/065 |
| 2020/0243265 A1* | 7/2020 | Berolini | H01G 4/302 |
| 2021/0175016 A1* | 6/2021 | Yun | H01G 4/2325 |

\* cited by examiner

B

MULTI-LAYER CERAMIC ELECTRONIC COMPONENT AND MANUFACTURING METHOD THEREOF

CROSS-REFERENCE TO RELATED APPLICATION

The present application claims the benefit of priority to Korean Patent Application No. 10-2019-0165448 filed on Dec. 12, 2019 in the Korean Intellectual Property Office, the disclosure of which is incorporated herein by reference in its entirety.

BACKGROUND

1. Field

The present disclosure relates to a multilayer ceramic electronic component and a manufacturing method thereof.

2. Description of Related Art

In recent years, with the trend for miniaturization of electronic products, multilayer ceramic electronic components are also required to be miniaturized while having high capacity. In accordance with the demand for miniaturization and high capacity in multilayer ceramic electronic components, external electrodes of multilayer ceramic electronic components are also becoming thinner.

Conventionally, in order to form an external electrode, an external electrode paste is prepared by mixing a conductive metal, glass, an organic solvent, and the like, and the external electrode paste is coated on both end surfaces of a ceramic body, and formed by sintering.

However, it may be difficult to reduce an applying thickness to a certain level or less due to the high viscosity of the external electrode paste, and, if the viscosity of the paste is lowered, a problem of phase stability may occur, and miniaturization of a size of metal powder particles used in the external electrode paste may also be difficult.

In particular, as the multilayer ceramic electronic component is miniaturized and implemented with high capacity, there is a need for a thickness of the external electrode to be thinned. However, when the thickness of the external electrodes is reduced, there is a problem in that contact with an internal electrode is lowered, and there is a problem in that it has a structure vulnerable to external physical and chemical impacts due to thin external electrodes, and mechanical strength is lowered.

SUMMARY

An aspect of the present disclosure is to provide a multilayer ceramic electronic component having improved contact between an internal electrode and an external electrode and a manufacturing method thereof.

Another aspect of the present disclosure is to provide a multilayer ceramic electronic component having improved bonding force between an internal electrode and an external electrode and a manufacturing method thereof.

Another aspect of the present disclosure is to provide a multilayer ceramic electronic component having improved mechanical strength and a manufacturing method thereof.

According to an aspect of the present disclosure, a multilayer ceramic electronic component includes: a ceramic body including first and second surfaces opposing each other in a thickness direction, third and fourth surfaces opposing each other in a width direction, and fifth and sixth surfaces opposing each other in a longitudinal direction, and including a capacitance formation portion having a dielectric layer and first and second internal electrodes stacked in the thickness direction with the dielectric layer interposed therebetween; first and second conductive layers disposed on the fifth and sixth surfaces of the ceramic body, respectively, and each including a first conductive metal; and first and second external electrodes each including a second conductive metal and covering the first and second conductive layers, respectively. The first and second conductive layers each have a network structure.

According to another aspect of the present disclosure, a manufacturing method of a multilayer ceramic electronic component includes operations of: applying an organic metal to an end portion of the first and second internal electrodes of a ceramic body in which a dielectric layer and first and second internal electrodes are stacked in a thickness direction with the dielectric layer interposed therebetween; and performing heat-treatment to form first and second conductive layers.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
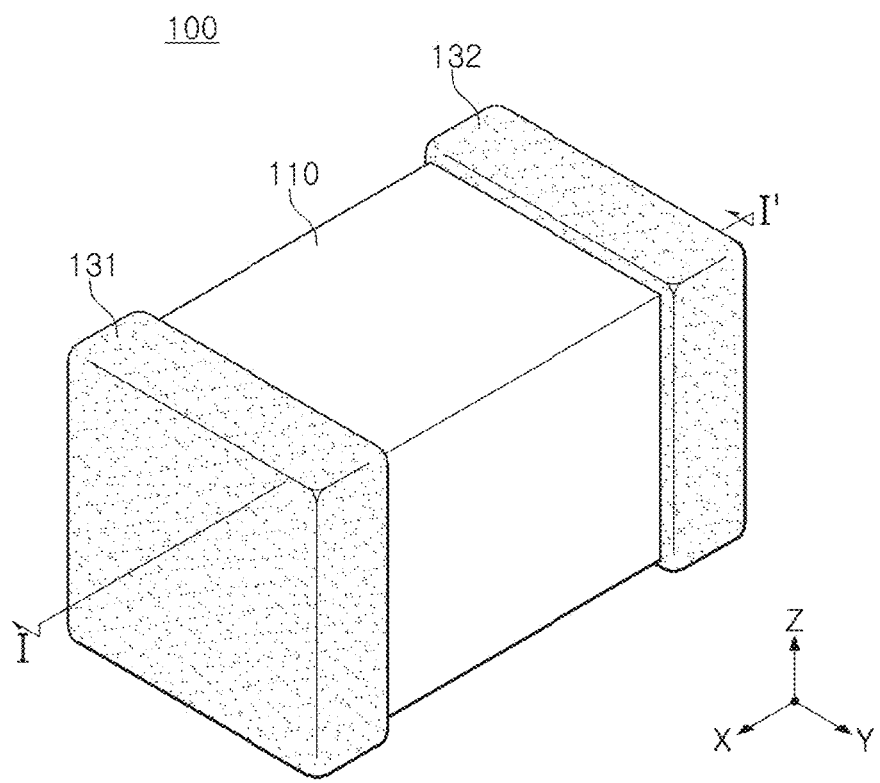
FIG. 1 is a schematic perspective view illustrating a multilayer ceramic electronic component according to an exemplary embodiment of the present disclosure.

Hereinafter, embodiments of the present disclosure will be described in detail with reference to the accompanying drawings. The present disclosure may, however, be exemplified in many different forms and should not be construed as being limited to the specific embodiments set forth herein, but should be understood to include various modifications, equivalents, and/or alternatives to the embodiments of the present disclosure. In relation to the description of the drawings, similar reference numerals may be used for similar components.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the present specification, expressions such as "having", "may have", "comprises", or "may contain" may include a presence of a corresponding feature (e.g., components such as numerical, functions, operations, components, or the like), and a presence of additional feature does not be excluded.

In the present specification, expressions such as "A or B", "at least one of A or/and B", "one or more of A or/and B", or the like may include all possible combinations items listed together. For example, "A or B", "at least one of A and B", or "at least one of A or B" may refer to include cases of (1) at least one A, (2) at least one B, or (3) both including at least one A and at least one B.

In the drawing, an X direction may be defined as a first direction, an L direction, or a longitudinal direction, a Y direction may be defined as a second direction, a W direction, or a width direction, and a Z direction may be defined as a third direction, a T direction, or a thickness direction.

Hereinafter, a multilayer ceramic electronic component according to an exemplary embodiment of the present disclosure will be described in detail with reference to FIGS. 1 to 5.

Referring to FIGS. 1 to 5, a multilayer ceramic electronic component 100 may include: a ceramic body 110 including first and second surfaces S1 and S2 opposing in the third direction (e.g., Z direction), third and fourth surfaces S3 and S4 opposing in the second direction (e.g., Y direction), and fifth and sixth surfaces S5 and S6 opposing in the first direction (e.g., X direction), and including a capacitance formation portion having a dielectric layer and first and second internal electrodes 121 and 122 disposed to be stacked in a third direction (Z direction) with the dielectric layer interposed therebetween; first and second conductive layers 141 and 142 disposed on the fifth surface S5 and the sixth surface S6 of the ceramic body 110, respectively, and including a first conductive metal; and first and second external electrodes 131 and 132 including a second conductive metal and disposed to cover the first and second conductive layers 141 and 142.

In this case, the first and second conductive layers 141 and 142 may have a network structure. In the present specification, the "network structure" may mean a three-dimensional network structure (e.g., mesh structure), and the three-dimensional network structure may mean that each of basic units entangled in two-dimensions is entangled in three-dimensions again and finally has a three-dimensional network structure. The "entangled" may mean that two or more strands cross each other through a physical contact. In the multilayer ceramic electronic component according to the present disclosure, since the first and second conductive layers 141 and 142 have a network structure, as described below, contact between the internal electrode and the external electrode may be improved, and the bonding strength may be improved.

In an exemplary embodiment of the present disclosure, the ceramic body 110 may include a capacitance formation portion in which a dielectric layer 111 and first and second internal electrodes 121 and 122 are disposed to be stacked in a third direction (Z direction) with the dielectric layer 111 interposed therebetween.

Although a specific shape of the ceramic body 110 is not particularly limited, as shown, the ceramic body 110 may be formed to have a hexahedral shape or a shape similar thereto. Due to shrinkage of ceramic powder particles contained in the ceramic body 110 during a sintering process, the ceramic body 110 may have a substantially hexahedral shape, although not a hexahedral shape having perfectly straight lines. The ceramic body 110 may have first and second surfaces S1 and S2 opposing each other in a thickness direction (Z direction), third and fourth surfaces S3 and S4 connected to the first and second surfaces S1 and S2 and opposing each other in a width direction (Y direction), and fifth and sixth surfaces S5 and S6 connected to the first and second surfaces S1 and S2, connected to the third and fourth surfaces S3 and S4 and opposing each other in a longitudinal direction (X direction).

The ceramic body 110 may be formed by alternately stacking a ceramic green sheet in which a first internal electrode 121 is printed on the dielectric layer 111 and a ceramic green sheet in which a second internal electrode 122 is printed on the dielectric layer 111 in a thickness direction (the Z direction).

The capacitance formation portion may be formed by alternately stacking the dielectric layer 111 and the internal electrodes 121 and 122 in a third direction (the Z direction). A plurality of dielectric layers 111 forming the capacitance formation portion may be in a sintered state, and boundaries between adjacent dielectric layers 111 may be integrated such that they may be difficult to confirm without using a scanning electron microscope (SEM).

According to an exemplary embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used.

A variety of ceramic additives, organic solvents, plasticizers, binders, dispersants, and the like may be added to powder particles such as barium titanate ($BaTiO_3$), and the like, depending on the purpose of the present disclosure.

For example, the dielectric layer 111 may be formed by applying and drying a slurry formed by including powder such as barium titanate ($BaTiO_3$) on a carrier film to prepare a plurality of ceramic sheets. The ceramic sheet may be formed by mixing ceramic powder, a binder, and a solvent to prepare a slurry, and manufacturing the slurry into a sheet having a thickness of several μms by a doctor blade method, but is not limited thereto.

A multilayer ceramic electronic component of the present disclosure may be disposed such that a plurality of internal electrodes 121 and 122 are disposed to oppose each other with the dielectric layer 111 interposed therebetween. The internal electrodes 121 and 122 may include first and second internal electrodes 121 and 122 that are alternately disposed to oppose each other with the dielectric layer 111 interposed therebetween.

The first internal electrode 121 may be exposed to one surface S5 of the ceramic body 110 in the first direction (the X direction), and a portion exposed to the one surface S5 in the first direction (the X direction) may be connected to a first conductive layer 141. The second internal electrode 122 may be exposed to the other surface S6 of the ceramic body 110 in the first direction (the X direction), and a portion exposed to the other surface S6 of the first direction (the X direction) may be connected to a second conductive layer 142. In the first and second conductive layers, a first conductive metal may form a network structure, and the first conductive metal may be connected to the first and second internal electrodes 121 and 122. In the first and second conductive layers, a first conductive metal may form a network structure, and the first conductive metal may be connected to the first and second internal electrodes 121 and 122. The first and second internal electrodes 121 and 122 may be electrically separated from each other by the dielectric layer 111 disposed in a middle.

A material for forming the first and second internal electrodes 121 and 122 is not particularly limited, and for example, the first and second internal electrodes 121 and 122 may be formed by using a conductive paste including one or more materials of silver (Ag), palladium (Pd), gold (Au), platinum (Pt), nickel (Ni), copper (Cu), tin (Sn), tungsten (W), titanium (Ti), and alloys thereof. As a printing method of the conductive paste, a screen-printing method, a gravure printing method, or the like, may be used, but the present disclosure is not limited thereto.

In a multilayer ceramic electronic component according to the present disclosure, a margin portion may be disposed on both surfaces of the capacitance formation portion in a second direction (the Y direction). The margin portion may be disposed on both surfaces of the capacitance formation portion in the second direction (the Y direction), perpendicular to the first and third directions (the X and Z directions), respectively. The margin portion may serve to prevent damages to the internal electrodes due to physical or chemical stresses.

The margin portion may be made of an insulating material, and may be made of a ceramic material such as barium titanate, or the like. In this case, the margin portion may include the same ceramic material as that included in the dielectric layer 111, or may be made of the same material as the dielectric layer 111. A method for forming the margin portion is not particularly limited. For example, an area of the dielectric layer included in the capacitance formation portion may be formed to be greater than an area of the internal electrode, to form a margin area may be formed in a remaining circumferential portion except for the portion of the internal electrode connected to the external electrode, or it may be formed by applying a slurry containing ceramic or attaching a dielectric sheet to both surfaces of the capacitance formation portion in a second direction (the Y direction).

The multilayer ceramic electronic component according to the present disclosure may include a cover portion 112. The cover portion 112 may be disposed on both surfaces of the capacitance formation portion in the third direction (Z direction), and may be disposed at an outermost portion of the first and second internal electrodes 121 and 122. The cover portion 112 may be disposed below the internal electrode of a lowermost portion of the body 110 and above the internal electrode of an uppermost portion thereof. In this case, the cover portion 112 may be formed of the same composition as the dielectric layer 111, and may be formed by stacking at least one or more dielectric layers that do not include an internal electrode on an upper portion of the uppermost internal electrode and on a lower portion of the lowermost internal electrode of the body 110, respectively. The cover portion 112 may basically serve to prevent damages to the internal electrode due to physical or chemical stresses.

In an exemplary embodiment of the present disclosure, the network structure of the first and second conductive layers 141 and 142 may have a matrix structure in which the first conductive metal in a form of nanostructures is irregularly disposed. In the present specification, a term "nano structure" may mean a microstructure having a size of 1 nm to 10 μm, each of which has a length, width, and height greater than or equal to a single molecule. The nanostructure may be a concept including a structure having a 1-dimensional, 2-dimensional and/or 3-dimensional structure. The nanostructure may be one or more selected from a group consisting of nanoparticles, nanowires, nanorods, nanosheets, nanosheets, nanobelts, nanodisks, nanotubes, and nanotetrapods, but is not limited thereto. Since the network structure of the first and second conductive layers 141 and 142 according to the present exemplary embodiment are formed by heat-treatment of an organic metallic liquid, as described below, and the first conductive metal is formed by precipitation and/or growth without orientation, the randomly selected nanostructures may form a matrix structure irregularly. Accordingly, the first and second conductive layers 141 and 142 may have an anchoring effect by having the matrix structure in which the first conductive metal is irregularly disposed, and may improve bonding force by maximizing a contact area with an external electrode disposed to cover the first and second conductive layers 141 and 142.

In one example, the first and second conductive layers 141 and 142 of the present disclosure may be disposed by dispersing a second conductive metal in the network structure. As described above, the first and second conductive layers 141 and 142 may form a 3-dimensional matrix structure, and voids exist in a portion in which the first conductive metal is not disposed. When an external electrode is formed on the first and second conductive layers 141 and 142, as described below, an external electrode paste may penetrate into the voids. Subsequently, when the external electrode paste is sintered and/or cured, a second conductive metal included in the external electrode paste may be dispersed in the voids and disposed. As described above, when the second conductive metal is dispersed and disposed in the network structure formed by the first conductive metal, a connection between the internal electrode and the external electrode may be further improved due to a tunneling effect between the first conductive metal and the second conductive metal.

In another example, the first and second conductive layers 141 and 142 of the present disclosure may have a porosity in a range of 0.2 to 0.9. In the present specification, a porosity ratio may mean a value representing an area occupied by pores relative to a total area. The porosity may be obtained through an electron scanning microscope analysis, a BET method, or the like. For example, an X-Y cross-section of the first and second conductive layers 141 and 142 may be captured using a scanning electron microscope (SEM, JSM-7400F by Jeol Corporation) and then calculated using an image analysis program (ImagePro Plus ver 4.5 of Mediacybernetics Corporation). The porosity ratio may be 0.20 or more, 0.22 or more, 0.24 or more, or 0.25 or more, 0.90 or less, 0.89 or less, 0.88 or less, 0.87 or less, 0.86 or less, or 0.85 or less, but is not limited thereto. The porosity ratio of the first and second conductive layers 141 and 142 may be implemented through the network structure described above. Within such ranges of the porosity ratio, the bonding force can be increased by maximizing contact areas between the conductive layers and the external electrodes.

Figure 2:
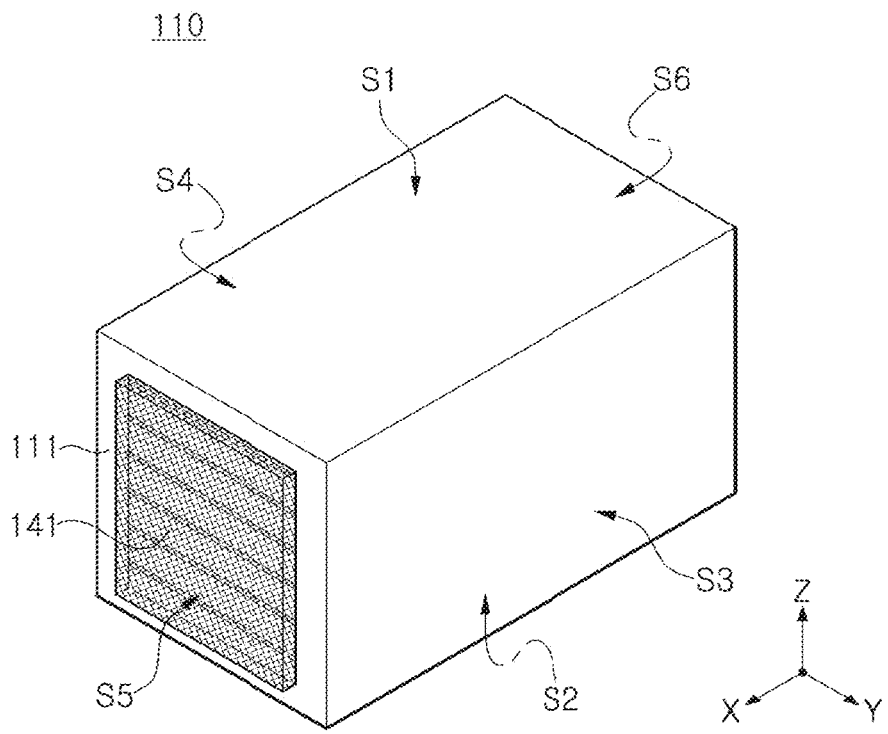
FIGS. 2 and 3 are schematic perspective views illustrating the ceramic body of FIG. 1.
Figure 3:
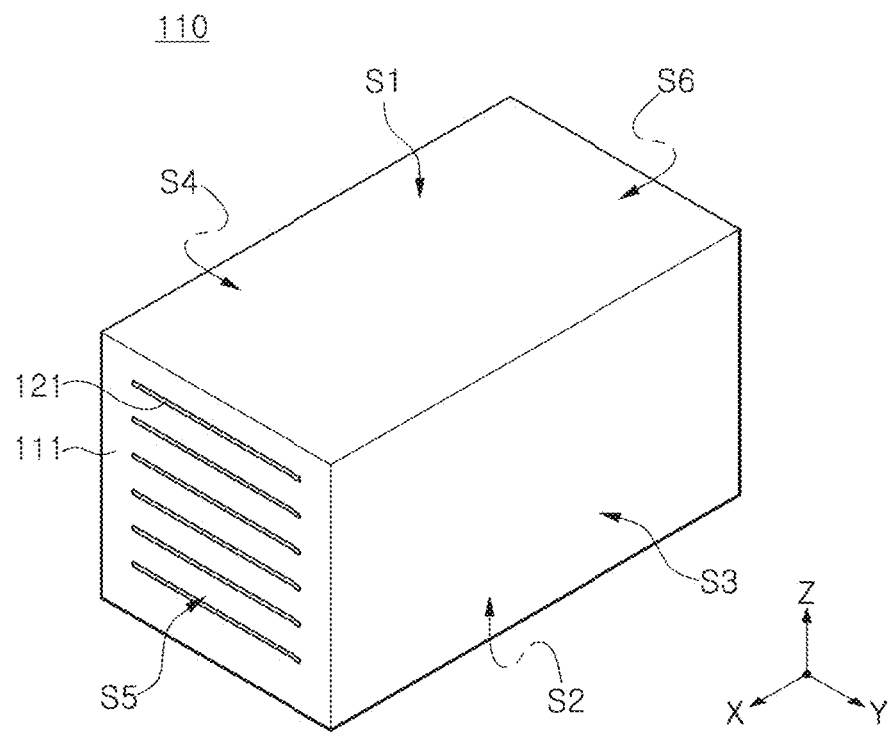
Figure 4:
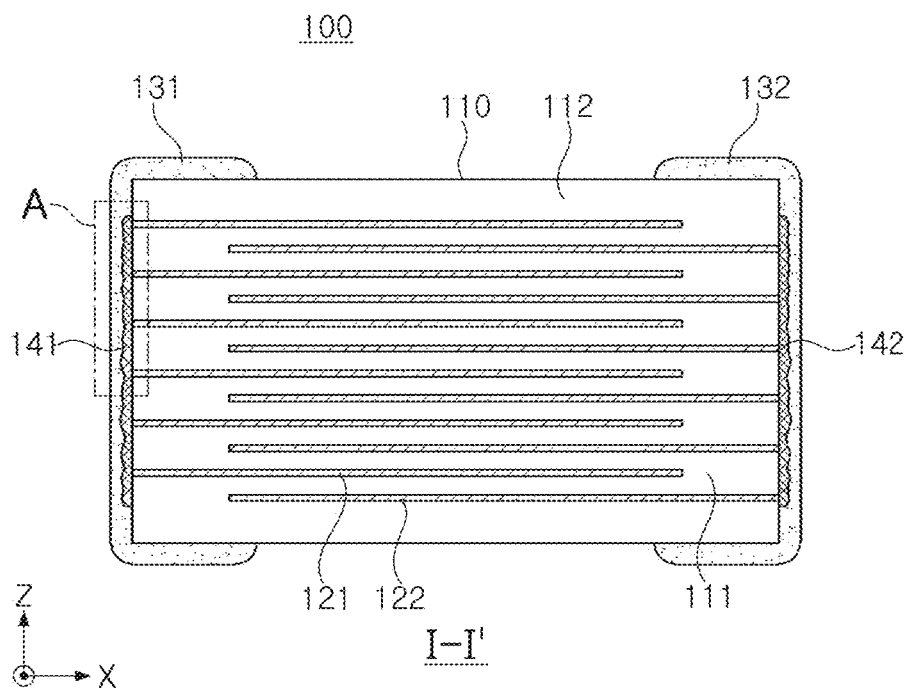
FIG. 4 is a cross-sectional view taken along line I-I' of FIG. 1.
Figure 5:
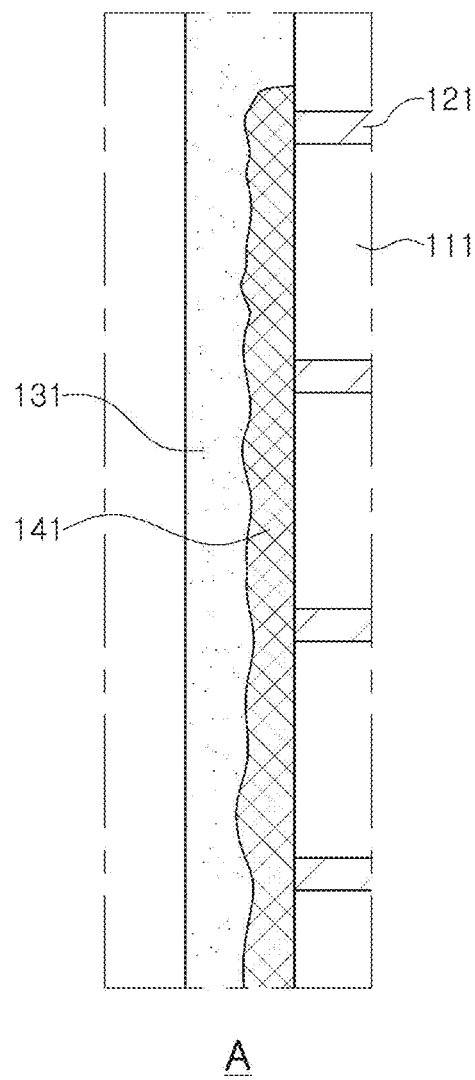
FIG. 5 is an enlarged view of region A of FIG. 1.

In an example of the present disclosure, the first and second conductive layers 141 and 142 may be disposed to cover the capacitance formation portion. Referring to FIGS. 2 and 4, the first and second conductive layers 141 and 142 may be disposed to cover all outermost internal electrodes, and may be disposed to cover a larger area than an area substantially corresponding to the capacitance formation portion. When the first and second conductive layers 141 and 142 are formed to cover a large area, a coating process of the organic metal, which will be described later, may be performed in a single step, thereby improving efficiency of the manufacturing process.

Figure 6:
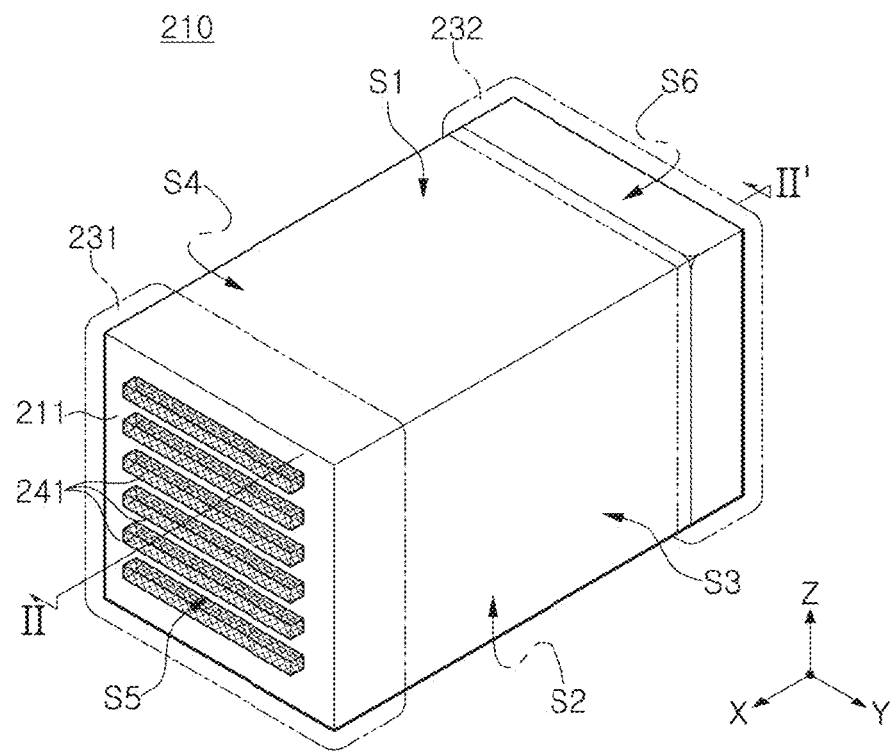
FIG. 6 is a schematic perspective view illustrating a multilayer ceramic electronic component according to another exemplary embodiment of the present disclosure.
Figure 7:
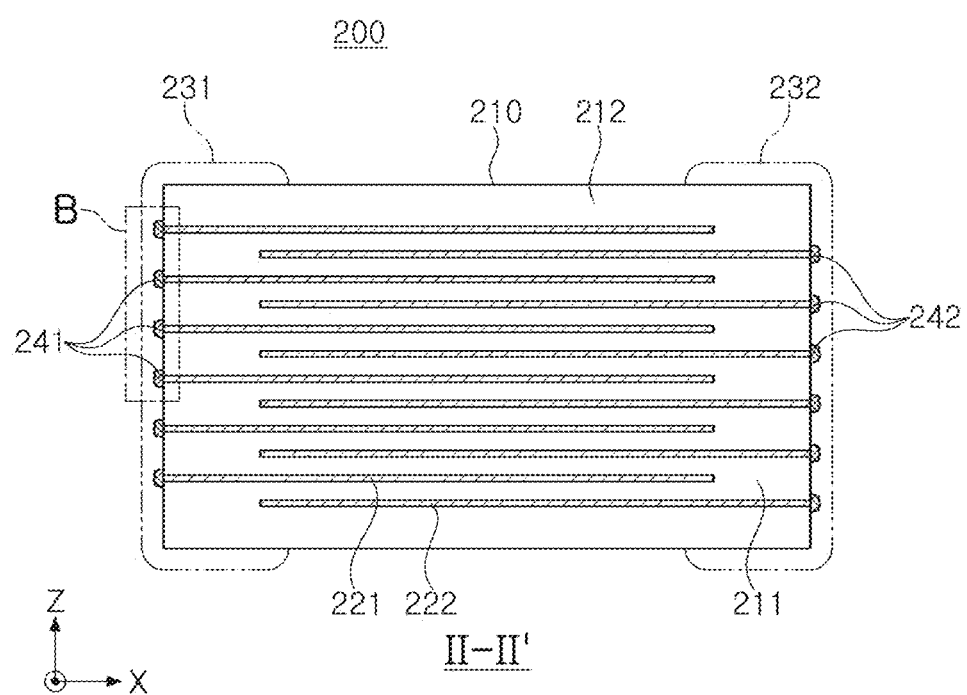
FIG. 7 is a cross-sectional view taken along line I-I' of FIG. 6.
Figure 8:
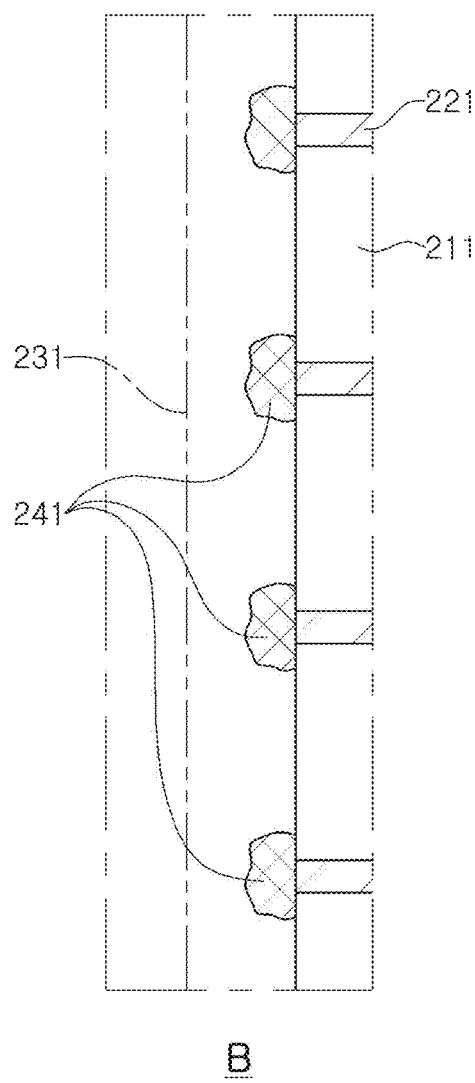
FIG. 8 is an enlarged view of region B of FIG. 7.

In another example of the present disclosure, a first conductive layer 241 may be composed of a plurality of first conductive layers, a second conductive layer 242 may be composed of a plurality of second conductive layers, a second conductive layer 242 may be composed of a plurality of second conductive layers, the plurality of first conductive layers may be disposed to cover a first internal electrode exposed to the fifth surface of the ceramic body, respectively, and the plurality of second conductive layers may be disposed to cover a second internal electrode exposed to the sixth surface of the ceramic body, respectively. FIGS. 6 to 8 are views illustrating a ceramic body 210 of a multilayer ceramic electronic component according to the present example. Referring to FIGS. 6 to 8, the first conductive layer 241 may be disposed at a plurality of positions in which a first internal electrode 221 is exposed in the ceramic body 210, and two or more first conductive layers 241 may be disposed or the same number of first conductive layers 241 as the first internal electrode 221 may be disposed. In addition, the second conductive layer 242 may be disposed at a plurality of positions in which the second internal electrode 222 is exposed in the ceramic body 210, and two or more second conductive layers 242 may be disposed or the same number of second conductive layers 242 as the second internal electrode 222 may be disposed. When a plurality of first and second conductive layers 241 and 242 are disposed in a position corresponding to the first and second internal electrodes 221 and 222 as described above, a contact area between the first and second conductive layers 241 and 242 and the first and second external electrodes 231 and 232 may be maximized to further improve contact between the internal electrode and the external electrode.

In the multilayer ceramic electronic component 100 according to the present disclosure, a first external electrode 131 and a second external electrode 132 may be disposed on both surfaces of the ceramic body in the first direction (X direction). The first external electrode 131 may be connected to the first internal electrode 121 through the first conductive layer 141, and the second external electrode 132 may be connected to the second internal electrode 122 through the second conductive layer 142.

The first and second external electrodes 131 and 132 may be disposed to cover the first and second conductive layers 141 and 142, and include a second conductive metal. As the second conductive metal included in the first external electrode 131 and the second external electrode 132, the second conductive metal, may be, for example, one or more conductive metals such as copper(Cu), nickel (Ni) may be used, tin (Sn), palladium (Pd), platinum (Pt), iron (Fe), gold (Au), silver (Ag), tungsten (W), titanium (Ti), lead (Pb) and alloys thereof.

In an exemplary embodiment of the present disclosure, the first and second external electrodes 131 and 132 may be conductive resin layers including a second conductive metal and a base resin. The second conductive metal may be in a form of power, and may be spherical or flake-shaped. The second conductive metal may be disposed to be in contact with each other or to be adjacent to each other in the conductive resin layer, and the base resin may be disposed to surround the metal particles. The base resin may be a thermosetting resin. The thermosetting resin may be an epoxy resin, but is not limited thereto. In the present exemplary embodiment, when the first and second external electrodes 131 and 132 are formed of a conductive resin layer, the external electrodes may be formed at a low temperature, and thus it may not affect the structures and/or shapes of the first and second conductive layers 141 and 142 described above, and moisture resistance reliability may be improved depending on the resin component.

In another exemplary embodiment of the present disclosure, the first and second external electrodes 131 and 132 may be sintered electrodes including glass. In the present exemplary embodiment, the glass may be one or more selected from a group consisting of silicon (Si), boron (B), aluminum (Al), transition metals, alkali metals, alkaline earth metals, oxides, nitrides, carbides thereof, and carbonates, but is not limited thereto. The transition metal may be selected from a group consisting of zinc (Zn), titanium (Ti), copper (Cu), vanadium (V), manganese (Mn), iron (Fe) and nickel (Ni), the alkali metal may be selected from a group consisting of lithium (Li), sodium (Na), and potassium (K), and the alkaline earth metal may be one or more selected from a group consisting of magnesium (Mg), calcium (Ca), strontium (Sr), and barium (Ba).

A formation material of the first external electrode 131 and the second external electrode 132 is not particularly limited. For example, as the formation material of the first external electrode 131 and the second external electrode 132, various methods, for example, a conductive paste including a second conductive metal and a base resin or a conductive paste including a second conductive metal and glass may be printed on a surface of a ceramic body by a screen printing method, a gravure printing method, or the like, or coated, the ceramic body may be dipped into the conductive paste, a dry film in which the conductive paste is dried may be transferred on the ceramic body, or the like, but is not limited thereto.

The present disclosure also relates to a method of manufacturing a multilayer ceramic electronic component. The manufacturing method of the multilayer ceramic electronic component according to the present disclosure may include an operation of applying an organic metal to an end portion of the first and second internal electrodes of a ceramic body in which a dielectric layer and internal electrodes are stacked in a third direction with the dielectric layer interposed therebetween and performing heat-treatment to form first and second conductive layers. In the above description, the descriptions on the dielectric layer, the internal electrode, and the like are the same as described above, and descriptions thereof will be omitted.

The first and second conductive layers of the multilayer ceramic electronic component according to the present disclosure may be formed of an organic metal. In the present specification, a term "organic metal" may mean a coordination compound in which a metal is surrounded by one or more ligands, and may mean a coordination compound in which anion or polar molecules and metal ions are coordinate covalent bonded. The number of the ligands is not particularly limited, and may be 1 coordination, 2 coordination, 4 coordination, 6 coordination or 8 coordination, but is not limited thereto. The metal may be included in a form of ions, and as long as it can form first and second conductive layers, the component is not particularly limited, for example, may be a transition metal. Various metals, for example, chromium (Cr), cobalt (Co), nickel (Ni), copper (Cu), platinum (Pt), lead (Pb), silver (Ag), zinc (Zn), iron (Fe), tin (Sn), etc., may be used as an organic metal.

In addition, the ligand may be provided from a chelate formation material. The chelate formation material that can provide the ligand is not particularly limited. As specific examples of the chelate formation material, there may be chelate formation materials of amines such as ethylenediamine, N-(2-hydroxyethyl) ethylenediamine, trimethylenediamine, 1,2-diaminocyclohexane, triethylenetetramine, diethylenetriamine, 1,2,3-triaminopropane, thiodiethylamine, triethanolamine, tetraethylenepentamine, pentaethylenehexamine, trishydroxymethylaminomethane, ethyldiethanolamine, triisopropanolamine, ethlenediaminetetracetic acid, or the like, bidentate ligands using aromatic ring nitrogen and amino nitrogen, such as 2-aminomethylpyridine, purine, adenine, histamine, or the like, and 1-3 diones and similar compounds thereof, that generate an acetylacetonate-type bidentate ligands, such as acetylacetone, 4,4,4-trifluoro-1-phenyl-1,3-butanedione, hexafluoroacetylacetone, benzoylacetone, dibenzoylmethane, 5,5-dimethyl-1,3-cyclohexanedione, auxin, 2-methyloxine, auxin-5-sulfonic acid, dimethylglyoxime, 1-nitroso-2-naphthol, 2-nitroso-1-naphthol, salicylaldehyde, or the like, but is not limited thereto. In addition, in the 1-3 diones and similar compounds that generate the acetylacetonate-type bidentate ligands, a keto body itself is not a chelating agent, but it has a ketoenol tautomerism. As a result that the enols function as acids, anion species produced by releasing protons may function as bidentate ligands of acetylacetonate-type.

The organic metal may be used in a solution phase, and has a very low viscosity compared to a general conductive paste. Therefore, in a method of manufacturing the multilayer ceramic electronic component of the present disclosure, by forming the first and second conductive layers by using the organic metal, it is possible to apply a metal in a solution state to the ceramic body to form a very thin conductive layer. In addition, since the organic metal is present in the solution in the same state as the metal ions, it is possible to maintain a high dispersity and evenly form the conductive layer.

In an exemplary embodiment of the present disclosure, in the method of manufacturing a multilayer ceramic electronic component of the present disclosure, heat-treatment may be performed at a temperature satisfying a range of 100° C. to 500° C. after applying the organic metal to the ceramic body. A solvent of the organic metallic solution may be volatized by the heat-treatment, and the chealate formation material may be thermally decomposed. In this process, a metal component in the organic metallic liquid, thinly applied to the surface of the ceramic body is precipitated and/or grown, and grows into a network structure without orientation. In this process, the internal electrode exposed to a side surface of the ceramic body and the conductive layer may contact to have a sufficient area, and then, in a process of forming an external electrode, an external electrode and a conductive layer may contact to have a sufficient area, such that the internal electrode and the external electrode may have high contact through the conductive layer even at a very thin thickness.

In an example, an operation applying an external paste on the first and second conductive layers to cover the first and second conductive layers of the ceramic body in which heat-treatment is completed, and then forming an external electrode may be further performed. The external electrode paste and a method thereof are the same as described above, and descriptions thereof will be omitted.

Experimental Examples

Copper (Cu) was dissolved in an acetylacetone solution at a molar concentration of 5M to prepare an organic metallic liquid of copper ions and acetylacetone. The organic metallic liquid was applied onto the fifth and sixth surfaces of the ceramic body in which the internal electrodes were exposed to the fifth and sixth surfaces, respectively, and then heat-treated at 300° C. for 3 hours.

Figure 9:
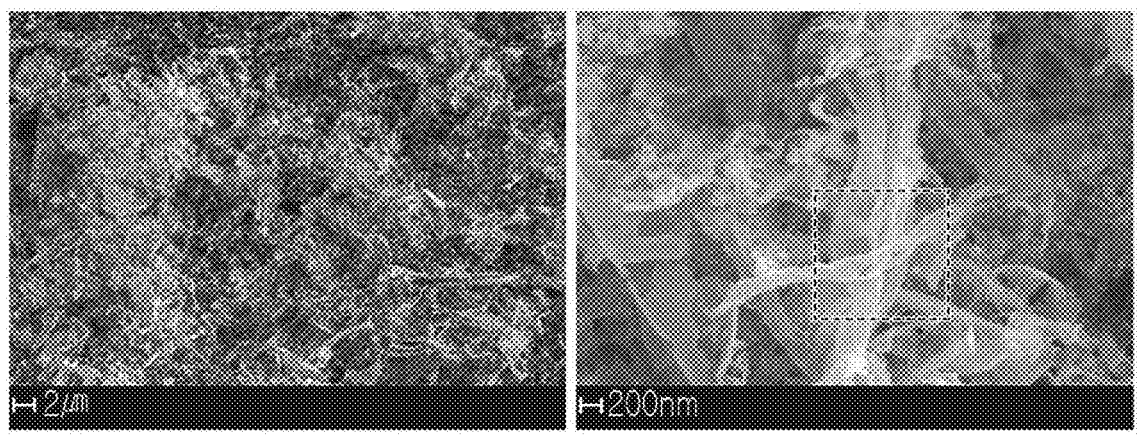
FIG. 9 is an SEM image of first and second conductive layers according to an exemplary embodiment of the present disclosure.
Figure 10:
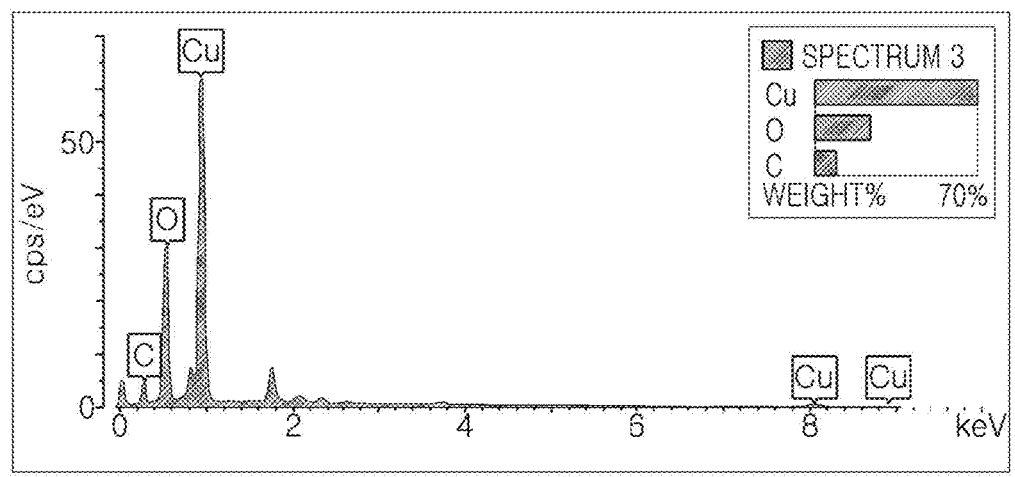
FIG. 10 is a SEM-EDS analysis result of the external electrode of the multilayer ceramic electronic component according to an exemplary embodiment of the present disclosure.

FIG. 9 is a SEM image of the first and second conductive layers after the heat-treatment is completed. Referring to FIG. 9, it can be confirmed that a metal forms a network structure (e.g., the annotated area in the figure with dotted line). FIG. 10 shows SEM-EDS analysis results of the conductive layer. Referring to FIGS. 9 and 10, it can be seen that most of the formed conductive layer is formed of copper. Through this, it can be confirmed that a metal conductive layer having a thin thickness and at the same time having a network matrix structure is formed.

As set forth above, according to the present disclosure, it is possible to provide a multilayer ceramic electronic component and a manufacturing method thereof, which can improve an contact between an internal electrode and an external electrode while having a reduced overall thickness.

According to another exemplary embodiment of the present disclosure, it is possible to provide a multilayer ceramic electronic component having improved bonding force between an internal electrode and an external electrode and a manufacturing method thereof.

According to another exemplary embodiment of the present disclosure, it is to provide a multilayer ceramic electronic component having improved mechanical strength and a manufacturing method thereof.

However, various and advantageous advantages and effects of the present disclosure are not limited to the above description, and will be more readily understood in the process of describing specific exemplary embodiments of the present disclosure.

While exemplary embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
    a ceramic body including first and second surfaces opposing each other in a thickness direction, third and fourth surfaces opposing each other in a width direction, and fifth and sixth surfaces opposing each other in a longitudinal direction, the ceramic body including a capacitance formation portion having a dielectric layer and first and second internal electrodes stacked in the thickness direction with the dielectric layer interposed therebetween;
    first and second conductive layers disposed on the fifth and sixth surfaces of the ceramic body, respectively, and each including a first conductive metal; and
    first and second external electrodes each including a second conductive metal, which is different from the first conductive metal, and covering the first and second conductive layers, respectively,
    wherein the first and second conductive layers each have a network structure,
    wherein the first and second conductive layers are arranged such that the second conductive metal of the first and second external electrodes is dispersed in the respective network structure of the first and second conductive layers.

2. The multilayer ceramic electronic component of claim 1, wherein the network structure of each of the first and second conductive layers is a matrix structure in which the respective first conductive metal in a form of a nanostructure is irregularly disposed.

3. The multilayer ceramic electronic component of claim 1, wherein the first and second conductive layers are disposed to cover the capacitance formation portion.

4. The multilayer ceramic electronic component of claim 1, wherein the first and second conductive layers each extend between two outermost internal electrodes in the thickness direction on the fifth and sixth surfaces of the ceramic body, respectively.

5. The multilayer ceramic electronic component of claim 1, wherein the first conductive layer is composed of a plurality of discrete first conductive layers,
the second conductive layer is composed of a plurality of discrete second conductive layers,
the plurality of discrete first conductive layers are disposed to cover the first internal electrodes exposed to the fifth surface of the ceramic body, respectively, and
the plurality of discrete second conductive layers are disposed to cover the second internal electrodes exposed to the sixth surface of the ceramic body, respectively.

6. The multilayer ceramic electronic component of claim 1, wherein the first and second conductive layers have a porosity ratio in a range of 0.2 to 0.9.

7. The multilayer ceramic electronic component of claim 1, wherein the first and second external electrodes each have a conductive resin layer including the second conductive metal and a base resin.

8. The multilayer ceramic electronic component of claim 1, wherein a length, width, and height of the first conductive metal is in a range of 1 nm to 10 μm.

9. The multilayer ceramic electronic component of claim 1, wherein the first conductive metal is connected to the first and second internal electrodes.

10. The multilayer ceramic electronic component of claim 1, wherein the capacitor body further includes a cover portion disposed on at least one surface of the capacitance formation portion in the thickness direction.

11. The multilayer ceramic electronic component of claim 10, wherein the cover portion is disposed above an uppermost internal electrode or below a lowermost internal electrode, in the thickness direction.

12. The multilayer ceramic electronic component of claim 1, wherein the second conductive metal is in a form of powder.

13. The multilayer ceramic electronic component of claim 12, wherein the powder of the second conductive metal is spherical or flake-shaped.

14. The multilayer ceramic electronic component of claim 1, wherein the first and second conductive layers include an organic metal.

15. A manufacturing method of a multilayer ceramic electronic component comprising operations of:
applying an organic metal compound to an end portion of the first and second internal electrodes of a ceramic body in which a dielectric layer and first and second internal electrodes are stacked in a thickness direction with the dielectric layer interposed therebetween; and
performing heat-treatment to form first and second conductive layers having a network structure.

16. The manufacturing method of a multilayer ceramic electronic component of claim 15, wherein the organic metal compound is a coordination compound in which a metal is surrounded by one or more ligands.

17. The manufacturing method of a multilayer ceramic electronic component of claim 15, wherein the heat-treatment is performed at a temperature satisfying a range of 100° C. to 500° C.

18. The manufacturing method of a multilayer ceramic electronic component of claim 15, further comprising an operation of
forming first and second external electrodes to cover the first and second conductive layers, respectively.

19. The manufacturing method of a multilayer ceramic electronic component of claim 15, wherein a metal component of the organic metal compound is included in a form of ions.

20. A multilayer ceramic electronic component, comprising:
a ceramic body including first and second surfaces opposing each other in a thickness direction, third and fourth surfaces opposing each other in a width direction, and fifth and sixth surfaces opposing each other in a longitudinal direction, the ceramic body including a capacitance formation portion having a dielectric layer and first and second internal electrodes stacked in the thickness direction with the dielectric layer interposed therebetween;
first and second conductive layers disposed on the fifth and sixth surfaces of the ceramic body, respectively, and each including a first conductive metal; and
first and second external electrodes each including a second conductive metal and covering the first and second conductive layers, respectively,
wherein:
the first and second conductive layers each have a network structure,
the first conductive layer is composed of a plurality of discrete first conductive layers,
the second conductive layer is composed of a plurality of discrete second conductive layers,
the plurality of discrete first conductive layers are disposed to cover the first internal electrodes exposed to the fifth surface of the ceramic body, respectively, and
the plurality of discrete second conductive layers are disposed to cover the second internal electrodes exposed to the sixth surface of the ceramic body, respectively.

* * * * *